United States Patent
Utsumi et al.

(10) Patent No.: US 7,599,786 B2
(45) Date of Patent: Oct. 6, 2009

(54) POWER OUTPUT APPARATUS, VEHICLE EQUIPPED WITH POWER OUTPUT APPARATUS, AND CONTROL METHOD OF POWER OUTPUT APPARATUS

(75) Inventors: Atsuko Utsumi, Toyota (JP); Takahiro Nishigaki, Nagoya (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 349 days.

(21) Appl. No.: 11/645,204

(22) Filed: Dec. 26, 2006

(65) Prior Publication Data
US 2007/0149349 A1    Jun. 28, 2007

(30) Foreign Application Priority Data
Dec. 28, 2005   (JP)   ............... 2005-379232

(51) Int. Cl.
G06F 19/00   (2006.01)
F02D 41/14   (2006.01)
B60K 1/02    (2006.01)
G01M 15/00   (2006.01)

(52) U.S. Cl. ............... 701/112; 701/109; 701/114; 123/688; 477/3

(58) Field of Classification Search ......... 701/101–105, 701/109, 112–115; 123/179.3, 179.4, 672, 123/688; 477/3; 73/114.69, 114.73; 180/65.2, 180/65.3; 903/905, 909, 941
See application file for complete search history.

(56) References Cited

U.S. PATENT DOCUMENTS

| | | | |
|---|---|---|---|
| 3,948,228 A * | 4/1976 | Luchaco ............... | 123/688 |
| 6,543,431 B2 * | 4/2003 | Surnilla et al. ........ | 123/179.4 |
| 6,604,032 B1 * | 8/2003 | Moller ................... | 701/114 |
| 6,961,653 B2 * | 11/2005 | Maki ..................... | 701/109 |
| 7,021,300 B2 * | 4/2006 | Maki et al. ............. | 123/688 |

FOREIGN PATENT DOCUMENTS

| | | |
|---|---|---|
| JP | A 10-212999 | 8/1998 |
| JP | A 11-107834 | 4/1999 |
| JP | A 11-218045 | 8/1999 |
| JP | 2005036790 A * | 2/2005 ............... 701/109 |

* cited by examiner

Primary Examiner—Willis R Wolfe, Jr.
(74) Attorney, Agent, or Firm—Oliff & Berridge, PLC

(57) ABSTRACT

A vehicle is equipped with a planetary gear mechanism including a sun gear, a carrier, and a ring gear that are respectively connected to a first motor, an engine, and a driveshaft. A second motor is further linked to the driveshaft. An air-fuel ratio sensor located in an exhaust system of the engine detects the air-fuel ratio while the engine is rotated in a fuel cut state. Normality or abnormality of the air-fuel ratio sensor is identified, based on a result of determination whether the detected air-fuel ratio is out of a specified normal range. When engine stop conditions for stopping the operation (rotation) of the engine are satisfied during execution of failure detection of the air-fuel ratio sensor (steps S300 and S310), the drive control of the invention maintains the rotation of the engine in the fuel cut state until completion of the failure detection of the air-fuel ratio sensor and controls the first motor to motor the engine (step S330). The operation of the engine is stopped on completion of the failure detection (step S320).

16 Claims, 11 Drawing Sheets

POWER OUTPUT APPARATUS, VEHICLE EQUIPPED WITH POWER OUTPUT APPARATUS, AND CONTROL METHOD OF POWER OUTPUT APPARATUS

BACKGROUND OF THE INVENTION

1. Technical Field

The present invention relates to a power output apparatus that outputs power to a driveshaft, a vehicle equipped with the power output apparatus, and a control method of the power output apparatus.

2. Description of the Related Art

One proposed configuration of a power output apparatus uses an oxygen concentration sensor that is located in an exhaust conduit of an engine to measure the oxygen concentration in exhaust emission from the engine (see, for example, Japanese Patent Laid-Open Gazette No. H10-212999). The proposed power output apparatus increases the power supply to a heater of the oxygen concentration sensor and raises the voltage applied to a sensor element in response to a fuel cut operation of the engine during deceleration. An output signal of the oxygen concentration sensor under the condition that an integrated value of exhaust flow rate since the start of the fuel cut condition reaches or exceeds a preset reference level is set to a reference value of the oxygen concentration sensor. The output signal of the oxygen concentration sensor is corrected according to the temperature of the sensor element and the pressure of the exhaust emission. A failure of the oxygen concentration sensor is detected, based on a result of comparison between the corrected output signal and a preset failure detection value.

SUMMARY OF THE INVENTION

A power output apparatus mounted on a vehicle that allows intermittent operation of the engine during a drive has the significantly less frequency of rotation of the engine in the fuel cut condition, compared with the proposed power output apparatus. There is accordingly only the insufficient chance of detecting the current status of the oxygen concentration sensor. A series of additional processing is required to assure the sufficient chance of detecting the current status of the oxygen concentration sensor in the vehicle that allows intermittent operation of the engine during a drive. There is also a demand for a quick response to the driver's accelerator operation.

The power output apparatus of the invention, the vehicle equipped with the power output apparatus, and the control method of the power output apparatus thus aim to assure the sufficient chance of detecting the current status of an oxygen concentration measurement unit. The power output apparatus of the invention, the vehicle equipped with the power output apparatus, and the control method of the power output apparatus also aim to ensure a sufficient response to a driver's drive demand during detection of the current status of the oxygen concentration measurement unit.

In order to attain at least part of the above and the other related objects, the power output apparatus of the invention, the vehicle equipped with the power output apparatus, and the control method of the power output apparatus have the configurations discussed below.

The present invention is directed to a power output apparatus that outputs power to a driveshaft. The power output apparatus includes: an internal combustion engine that is operable independently of a rotating state of the driveshaft; a motoring structure that is capable of motoring the internal combustion engine; an oxygen concentration measurement unit that is located in an exhaust system of the internal combustion engine to measure an oxygen concentration in exhaust emission from the internal combustion engine; a status detection module that detects a current status of the oxygen concentration measurement unit based on a measurement result of the oxygen concentration measurement unit, when a predetermined execution condition is satisfied in a fuel injection-stop engine rotation state where the internal combustion engine is rotated with stop of fuel injection; and a status detection-time control module that controls the internal combustion engine and the motoring structure to maintain the fuel injection-stop engine rotation state upon satisfaction of a predetermined cancellation condition for canceling the fuel injection-stop engine rotation state during detection of the current status of the oxygen concentration measurement unit by said status detection module. The status detection-time control module controls the internal combustion engine and the motoring structure to cancel the fuel injection-stop engine rotation state on completion of the detection of the current status.

In the power output apparatus of the invention, the current status of the oxygen concentration measurement unit is detected based on the measurement result of the oxygen concentration measurement unit, when the predetermined execution condition is satisfied in the fuel injection-stop engine rotation state where the internal combustion engine is rotated with stop of fuel injection. Upon satisfaction of the predetermined cancellation condition for canceling the fuel injection-stop engine rotation state during detection of the current status of the oxygen concentration measurement unit, the internal combustion engine and the motoring structure are controlled to maintain the fuel injection-stop engine rotation state. On completion of the detection of the current status, the internal combustion engine and the motoring structure are controlled to cancel the fuel injection-stop engine rotation state. Such control prevents interruption of the fuel injection-stop engine rotation state before completion of the detection of the current status of the oxygen concentration measurement unit. This desirably assures the sufficient chance of detecting the current status of the oxygen concentration measurement unit.

In the power output apparatus of the invention, for example, the status detection module requires a certain time period for detection of the current status of the oxygen concentration measurement unit. This arrangement assures the sufficient chance of detecting the current status of the oxygen concentration measurement unit. In this case, the status detection module may detect a failure of the oxygen concentration measurement unit as the current status, based on a result of determination whether the oxygen concentration measured by the oxygen concentration measurement unit has continuously been out of a specified normal range for a preset time period. This arrangement enables accurate detection of a failure of the oxygen concentration measurement unit.

In one preferable embodiment of the power output apparatus of the invention, when an operation stop request of the internal combustion engine is given as the predetermined cancellation condition for canceling the fuel injection-stop engine rotation state during detection of the current status of the oxygen concentration measurement unit by the status detection module, the status detection-time control module may control the internal combustion engine and the motoring structure to maintain the fuel injection-stop engine rotation state until completion of the detection by the status detection module. The status detection-time control module may control the internal combustion engine and the motoring structure to stop operation of the internal combustion engine on completion of the detection by the status detection module.

In one preferable example of this application, the power output apparatus may further include: a motor that is capable of inputting and outputting power from and to the driveshaft, and the motoring structure utilizes a reactive force of the driveshaft to motor the internal combustion engine, and the status detection-time control module drives and controls the motor to ensure output of a power, which is equivalent to a power demand required for the driveshaft, to the driveshaft. This arrangement ensures an effective response to the power demand even during detection of the current status of the oxygen concentration measurement unit. In another preferable example of this application, the motoring structure may include an electric power-mechanical power input output mechanism that is connected with an output shaft of the internal combustion engine and with the driveshaft and outputs at least part of output power of the internal combustion engine to the driveshaft through input and output of electric power and mechanical power. In the power output apparatus of this embodiment, the fuel injection-stop engine rotation state is activated upon satisfaction of a preset fuel injection stop condition when the power demand required for the driveshaft is less than a preset reference power, and when the power demand increases to or over the preset reference power during detection of the current status of the oxygen concentration measurement unit by the status detection module, the status detection-time control module controls the internal combustion engine, the electric power-mechanical power input output mechanism, and the motor to cancel the fuel injection-stop engine rotation state even during the detection of the current status and to ensure output of the power equivalent to the power demand to the driveshaft. This arrangement ensures a quick response to the power demand increasing to or over the preset reference power. In these cases, the electric power-mechanical power input output mechanism may include: a three shaft-type power input output module that is linked to three shafts, the output shaft of the internal combustion engine, the driveshaft, and a third shaft, and inputs and outputs power from and to a residual one shaft based on powers input from and output to any two shafts among the three shafts; and a generator that inputs and outputs power from and to the third shaft. Further, the electric power-mechanical power input output mechanism may include: a pair-rotor motor that has a first rotor connected to the output shaft of the internal combustion engine and a second rotor connected to the driveshaft and is driven to rotate through relative rotation of the first rotor to the second rotor.

The present invention is directed to a vehicle. The vehicle includes: an internal combustion engine that is operable independently of a rotating state of a driveshaft linked with an axle; a motoring structure that is capable of motoring the internal combustion engine; an oxygen concentration measurement unit that is located in an exhaust system of the internal combustion engine to measure an oxygen concentration in exhaust emission from the internal combustion engine; a status detection module that detects a current status of the oxygen concentration measurement unit based on a measurement result of the oxygen concentration measurement unit, when a predetermined execution condition is satisfied in a fuel injection-stop engine rotation state where the internal combustion engine is rotated with stop of fuel injection; and a status detection-time control module that controls the internal combustion engine and the motoring structure to maintain the fuel injection-stop engine rotation state upon satisfaction of a predetermined cancellation condition for canceling the fuel injection-stop engine rotation state during detection of the current status of the oxygen concentration measurement unit by the status detection module. The status detection-time control module controls the internal combustion engine and the motoring structure to cancel the fuel injection-stop engine rotation state on completion of the detection of the current status.

In the vehicle of the invention, the current status of the oxygen concentration measurement unit is detected based on the measurement result of the oxygen concentration measurement unit, when the predetermined execution condition is satisfied in the fuel injection-stop engine rotation state where the internal combustion engine is rotated with stop of fuel injection. Upon satisfaction of the predetermined cancellation condition for canceling the fuel injection-stop engine rotation state during detection of the current status of the oxygen concentration measurement unit, the internal combustion engine and the motoring structure are controlled to maintain the fuel injection-stop engine rotation state. On completion of the detection of the current status, the internal combustion engine and the motoring structure are controlled to cancel the fuel injection-stop engine rotation state. Such control prevents interruption of the fuel injection-stop engine rotation state before completion of the detection of the current status of the oxygen concentration measurement unit. This desirably assures the sufficient chance of detecting the current status of the oxygen concentration measurement unit.

In the vehicle of the invention, the status detection module may detect a failure of the oxygen concentration measurement unit as the current status, based on a result of determination whether the oxygen concentration measured by the oxygen concentration measurement unit has continuously been out of a specified normal range for a preset time period. This arrangement enables accurate detection of a failure of the oxygen concentration measurement unit.

In one preferable embodiment of the vehicle of the invention, when an operation stop request of the internal combustion engine is given as the predetermined cancellation condition for canceling the fuel injection-stop engine rotation state during detection of the current status of the oxygen concentration measurement unit by the status detection module, the status detection-time control module may control the internal combustion engine and the motoring structure to maintain the fuel injection-stop engine rotation state until completion of the detection by the status detection module. The status detection-time control module may control the internal combustion engine and the motoring structure to stop operation of the internal combustion engine on completion of the detection by the status detection module.

In another preferable embodiment of the vehicle of the invention, the vehicle may further include: a motor that is capable of inputting and outputting power from and to the driveshaft, and the motoring structure utilizes a reactive force of the driveshaft to motor the internal combustion engine, and the status detection-time control module drives and controls the motor to receive the reactive force and to ensure output of a power, which is equivalent to a power demand required for the driveshaft, to the driveshaft.

The present invention is also directed to a control method of a power output apparatus. The power output apparatus includes: an internal combustion engine that is operable independently of a rotating state of a driveshaft; a motoring structure that is capable of motoring the internal combustion engine; and an oxygen concentration measurement unit that is located in an exhaust system of the internal combustion engine to measure an oxygen concentration in exhaust emission from the internal combustion engine. The control method of the power output apparatus includes the steps of:

(a) detecting a current status of the oxygen concentration measurement unit based on a measurement result of the oxygen concentration measurement unit, when a predetermined execution condition is satisfied in a fuel injection-stop engine rotation state where the internal combustion engine is rotated with stop of fuel injection; and (b) controlling the internal combustion engine and the motoring structure to maintain the fuel injection-stop engine rotation state upon satisfaction of a predetermined cancellation condition for canceling the fuel injection-stop engine rotation state during detection of the current status of the oxygen concentration measurement unit in the step (a), and controlling the internal combustion engine and the motoring structure to cancel the fuel injection-stop engine rotation state on completion of the detection of the current status.

In the control method of the power output apparatus of the invention, the current status of the oxygen concentration measurement unit is detected based on the measurement result of the oxygen concentration measurement unit, when the predetermined execution condition is satisfied in the fuel injection-stop engine rotation state where the internal combustion engine is rotated with stop of fuel injection. Upon satisfaction of the predetermined cancellation condition for canceling the fuel injection-stop engine rotation state during detection of the current status of the oxygen concentration measurement unit, the internal combustion engine and the motoring structure are controlled to maintain the fuel injection-stop engine rotation state. On completion of the detection of the current status, the internal combustion engine and the motoring structure are controlled to cancel the fuel injection-stop engine rotation state. Such control prevents interruption of the fuel injection-stop engine rotation state before completion of the detection of the current status of the oxygen concentration measurement unit. This desirably assures the sufficient chance of detecting the current status of the oxygen concentration measurement unit.

In the control method of the power output apparatus of the invention, the step (a) may detect a failure of the oxygen concentration measurement unit as the current status, based on a result of determination whether the oxygen concentration measured by the oxygen concentration measurement unit has continuously been out of a specified normal range for a preset time period. This arrangement enables accurate detection of a failure of the oxygen concentration measurement unit.

In one preferable embodiment of the control method of the power output apparatus of the invention, when an operation stop request of the internal combustion engine is given as the predetermined cancellation condition for canceling the fuel injection-stop engine rotation state during detection of the current status of the oxygen concentration measurement unit by the step (a), the step (b) may control the internal combustion engine and the motoring structure to maintain the fuel injection-stop engine rotation state until completion of the detection by the step (a). The step (b) may control the internal combustion engine and the motoring structure to stop operation of the internal combustion engine on completion of the detection by the step (a).

DESCRIPTION OF THE PREFERRED EMBODIMENTS

Figure 1:
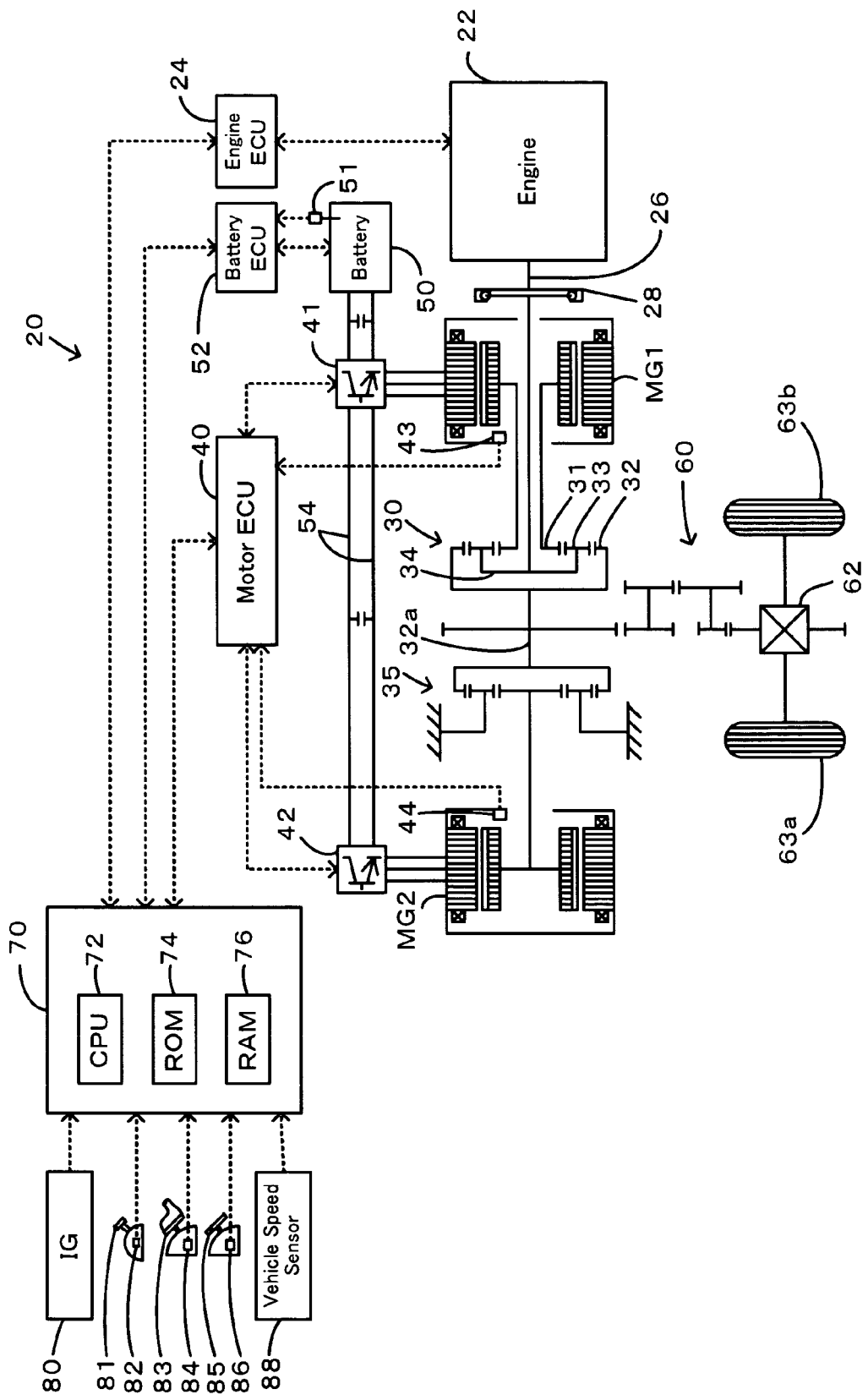
FIG. 1 schematically illustrates the configuration of a hybrid vehicle equipped with a power output apparatus in one embodiment of the invention.
Figure 2:
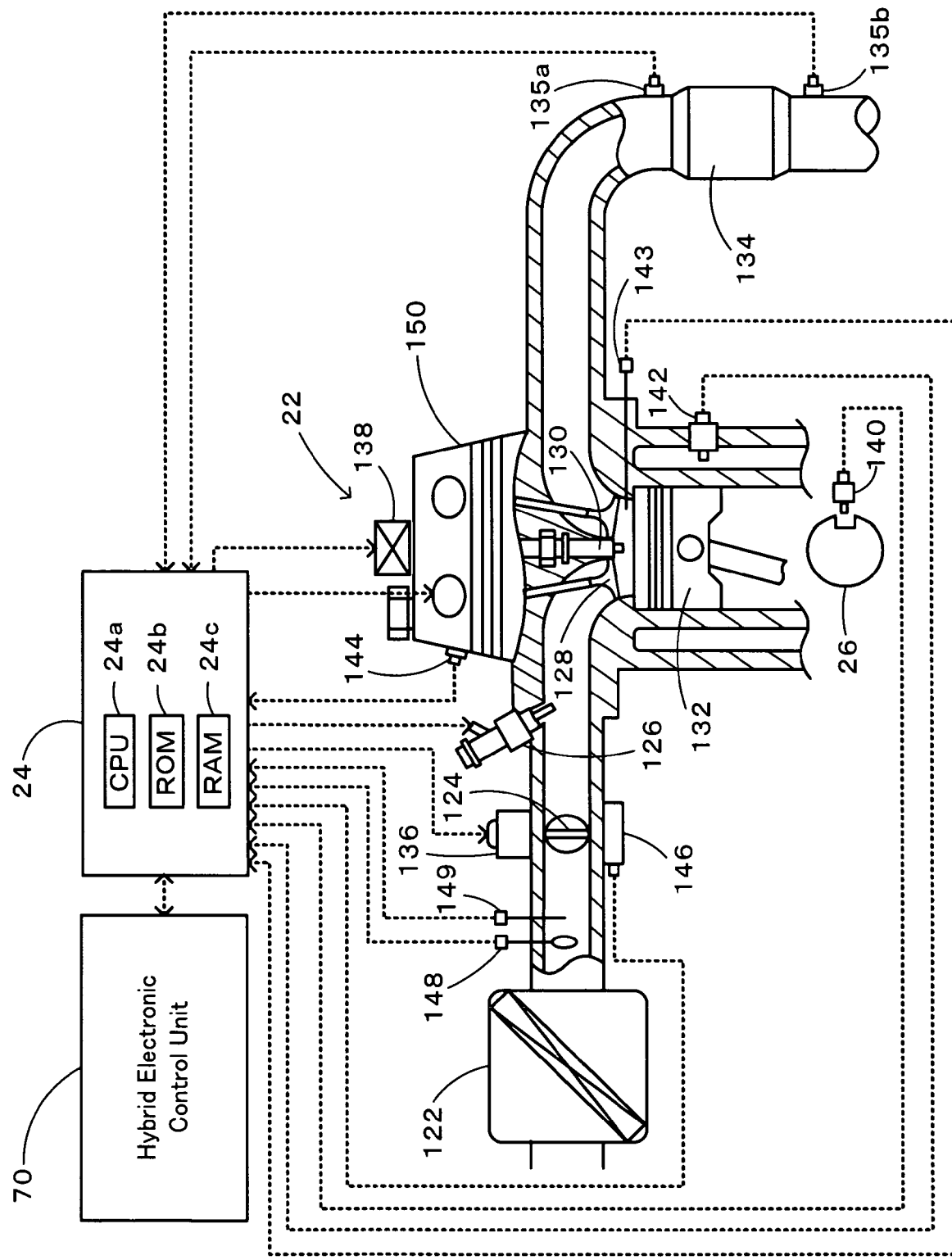
FIG. 2 schematically illustrates the structure of an engine mounted on the hybrid vehicle of the embodiment.

One mode of carrying out the invention is discussed below as a preferred embodiment. FIG. 1 schematically illustrates the construction of a hybrid vehicle 20 with a power output apparatus mounted thereon in one embodiment of the invention, and FIG. 2 schematically illustrates the structure of an engine mounted on the hybrid vehicle of the embodiment. As illustrated, the hybrid vehicle 20 of the embodiment includes an engine 22, a three shaft-type power distribution integration mechanism 30 that is linked with a crankshaft 26 functioning as an output shaft of the engine 22 via a damper 28, a motor MG1 that is linked with the power distribution integration mechanism 30 and is capable of generating electric power, a reduction gear 35 that is attached to a ring gear shaft 32a functioning as a drive shaft connected with the power distribution integration mechanism 30, another motor MG2 that is linked with the reduction gear 35, and a hybrid electronic control unit 70 that controls the whole power output apparatus.

The engine 22 is an internal combustion engine that consumes a hydrocarbon fuel, such as gasoline or light oil, to output power. As shown in FIG. 2, the air cleaned by an air cleaner 122 and taken in via a throttle valve 124 is mixed with the atomized fuel injected by a fuel injection valve 126 to the air-fuel mixture. The air-fuel mixture is introduced into a combustion chamber via an intake valve 128. The introduced air-fuel mixture is ignited with spark made by a spark plug 130 to be explosively combusted. The reciprocating motions of a piston 132 by the combustion energy are converted into rotational motions of a crankshaft 26. The exhaust from the engine 22 goes through a catalytic conversion unit 134 (filled with three-way catalyst) to convert toxic components included in the exhaust, that is, carbon monoxide (CO), hydrocarbons (HC), and nitrogen oxides (NOx), into harmless components, and is discharged to the outside air.

The engine 22 is under control of an engine electronic control unit 24 (hereafter referred to as engine ECU). The engine ECU 24 is constructed as a microprocessor including a CPU 24a, a ROM 24b that stores processing programs, a RAM 24c that temporarily stores data, input and output ports (not shown), and a communication port (not shown). The engine ECU 24 receives, via its input port, diverse signals from various sensors that measure and detect the operating conditions of the engine 22. The signals input into the engine ECU 24 include a crank position from a crank position sensor 140 detected as the rotational position of the crankshaft 26, a cooling water temperature from a water temperature sensor 142 measured as the temperature of cooling water in the engine 22, a cam position from a cam position sensor 144 detected as the rotational position of a camshaft driven to open and close the intake valve 128 and an exhaust valve for gas intake and exhaust into and from the combustion chamber, a throttle valve position from a throttle valve position sensor 146 detected as the opening or position of the throttle valve 124, an air flow meter signal from an air flow meter 148 located in an air intake conduit, an intake air temperature from a temperature sensor 149 located in the air intake conduit, an air-fuel ratio AF from an air-fuel ratio sensor 135a located upstream the catalytic conversion unit 134 in an exhaust conduit, and an oxygen concentration from an oxygen sensor 135b located downstream the catalytic conversion unit 134 in the exhaust conduit. The air-fuel ratio sensor 135a is a known limiting current sensor designed to detect the air-fuel ratio. Although not being specifically illustrated, the air-fuel ratio sensor 135a has two electrodes placed on respective faces of a solid electrolyte. One electrode is exposed to the exhaust, and the other electrode is exposed to the atmospheric air. Under application of a preset voltage between the two electrodes, the amount of oxygen ion shifting through the solid electrolyte is measured as electric current corresponding to the concentration of oxygen reaching the electrode exposed to the exhaust. The air-fuel ratio is computed from the measured electric current. The engine ECU 24 outputs, via its output port, diverse control signals and driving signals to drive and control the engine 22. The signals output from the engine ECU 24 include driving signals to the fuel injection valve 126, driving signals to a throttle valve motor 136 for regulating the position of the throttle valve 124, control signals to an ignition coil 138 integrated with an igniter, and control signals to a variable valve timing mechanism 150 to vary the open and close timings of the intake valve 128. The engine ECU 24 establishes communication with the hybrid electronic control unit 70 to drive and control the engine 22 in response to control signals received from the hybrid electronic control unit 70 and to output data regarding the operating conditions of the engine 22 to the hybrid electronic control unit 70 according to the requirements.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 63a and 63b via the gear mechanism 60, and the differential gear 62 from ring gear shaft 32a.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. The battery 50 is charged with a surplus of the electric power generated by the motor MG1 or MG2 and is discharged to supplement an insufficiency of the electric power. When the power balance is attained between the motors MG1 and MG2, the battery 50 is neither charged nor discharged. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature Tb measured by a temperature sensor 51 attached to the battery 50. The battery ECU 52 outputs data relating to the state of the battery 50 to the hybrid electronic control unit 70 via communication according to the requirements. The battery ECU 52 calculates a state of charge (SOC) of the battery 50, based on the accumulated charge-discharge current measured by the current sensor, for control of the battery 50.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

The hybrid vehicle 20 of the embodiment thus constructed calculates a torque demand to be output to the ring gear shaft 32*a* functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32*a*. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32*a*. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32*a*, simultaneously with charge or discharge of the battery 50. The motor drive mode stops the operations of the engine 22 and drives and controls the motor MG2 to output a quantity of power equivalent to the required level of power to the ring gear shaft 32*a*.

Figure 3:
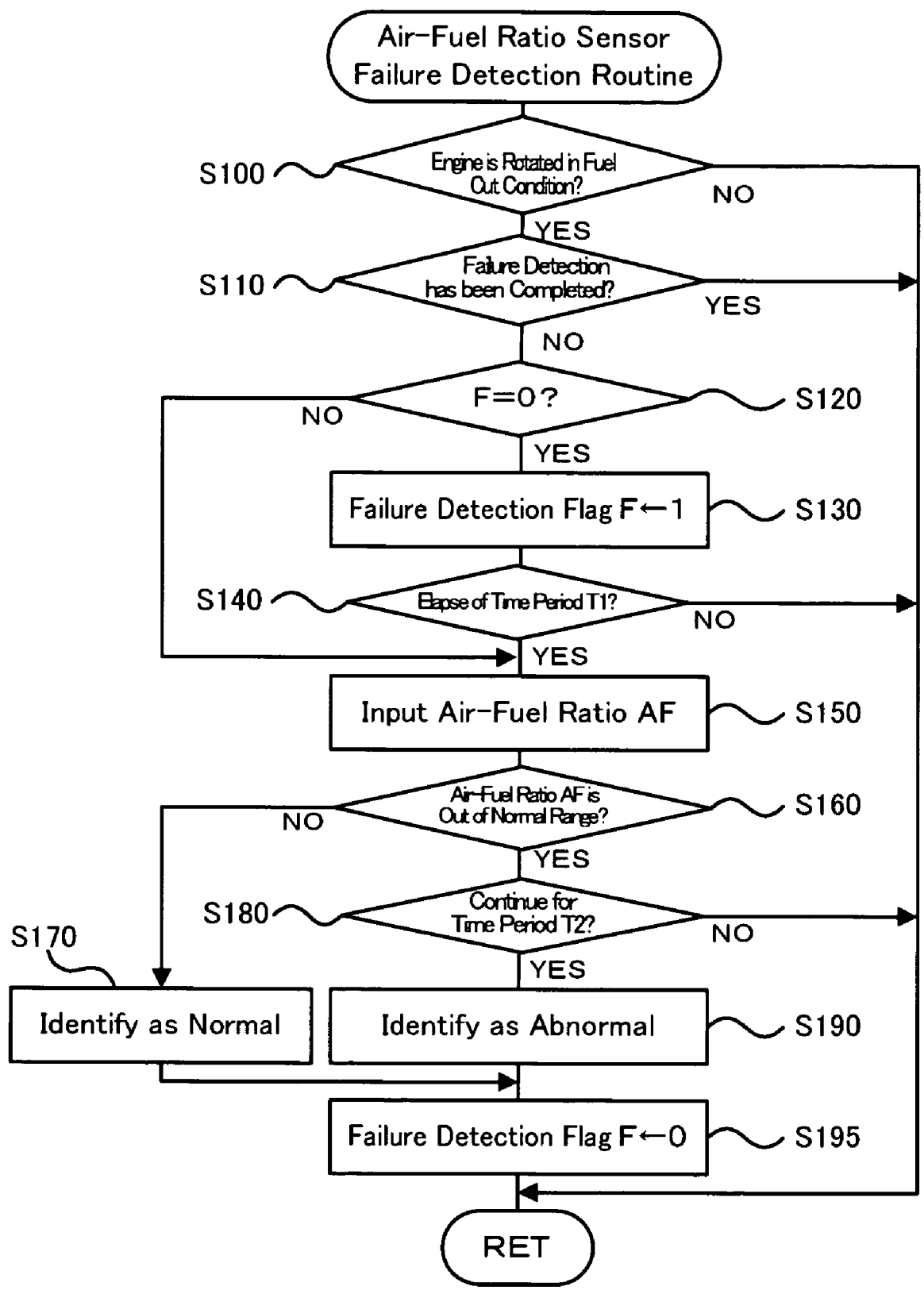
FIG. 3 is a flowchart showing an air-fuel ratio sensor failure detection routine.

The description regards the operations of the hybrid vehicle 20 of the embodiment having the configuration discussed above, especially detection of failure of the air-fuel ratio sensor 135*a* and relevant drive control. For the easy understanding, the explanation on the detection of failure of the air-fuel ratio sensor 135*a* precedes the explanation on the relevant drive control. FIG. 3 is a flowchart showing an air-fuel ratio sensor failure detection routine executed by the engine ECU 24. This failure detection routine is repeatedly performed at preset time intervals, for example, at every several msec.

Figure 4:
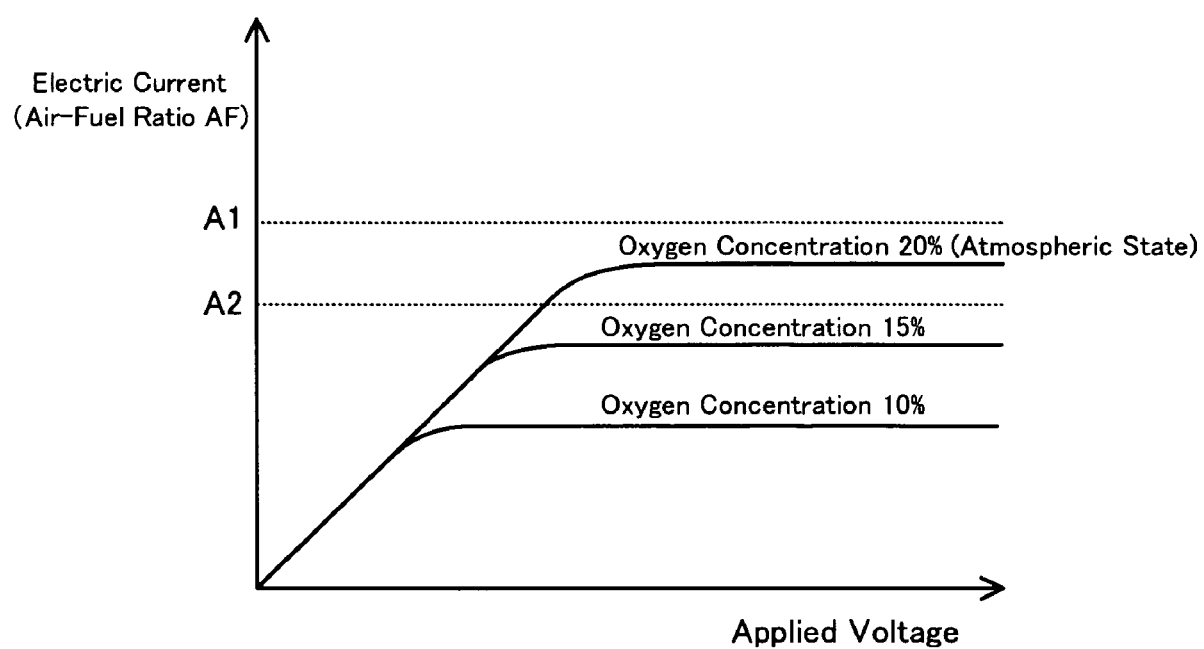
FIG. 4 is a graph showing a variation in electric current (air-fuel ratio AF) against the voltage applied with regard to different oxygen concentrations.

In the air-fuel ratio sensor failure detection routine, the CPU 24*a* of the engine ECU 24 first identifies whether the engine 22 is rotated in a fuel cut condition (step S100) and determines whether detection of failure of the air-fuel ratio sensor 135*a* has been completed (step S110). In the hybrid vehicle 20 of the embodiment, the detection of failure of the air-fuel ratio sensor 135*a* is performed once in each system activation time. A flag may be used for determining the completion or incompletion of failure detection. The flag is reset to its initial state at each timing of system activation and is set to a specific value representing completion of failure detection at every timing of completing the detection of failure of the air-fuel ratio sensor 135*a*. Upon identification that the engine 22 is not rotated in the fuel cut condition (step S100: no) or upon determination that the failure detection has already been completed (step S110: yes), the CPU 24*a* immediately exits from the air-fuel ratio sensor failure detection routine without any further processing. Upon identification that the engine 22 is rotated in the fuel cut condition (step S100: yes) and upon determination that the failure detection has not yet been completed (step S110: no), the CPU 24*a* checks the value of a failure detection flag F (step S120). The failure detection flag F is set equal to 0 by an initialization routine at a first processing cycle of the air-fuel ratio sensor failure detection routine. When the failure detection flag F is equal to 0 (step S120: yes), the CPU 24*a* sets the value '1' to the failure detection flag F (step S130) and waits until elapse of a preset time period T1 (step S140). The preset time period T1 represents a required time period for stable detection of the air-fuel ratio by the air-fuel ratio sensor 135*a* in the atmospheric state since the start of rotation of the engine 22 in the fuel cut condition. The preset time period T1 is, for example, 1 second or 2 seconds. After elapse of the preset time period T1 since the start of rotation of the engine 22 in the fuel cut condition (step S140: yes), the CPU 24*a* inputs the air-fuel ratio AF from the air-fuel ratio sensor 135*a* (step S150) and determines whether the input air-fuel ratio AF is out of a normal range (step S160). The normal range may be defined by an upper limit and a lower limit of the air-fuel ratio AF normally detected by the air-fuel ratio sensor 135*a* in the atmospheric state. FIG. 4 is a graph showing a variation in electric current measured by the air-fuel ratio sensor 135*a* (air-fuel ratio AF) against the voltage applied between the electrodes of the air-fuel ratio sensor 135*a* with regard to different oxygen concentrations. The air-fuel ratio AF (electric current) corresponding to the oxygen concentration is detected under application of the preset voltage between the electrodes of the air-fuel ratio sensor 135*a*. In this embodiment, the normal range is thus defined by an upper limit A1 and a lower limit A2 of the air-fuel ratio AF detected by the normal air-fuel ratio sensor 135*a* in the atmospheric state. The use of this normal range facilitates the failure detection of the air-fuel ratio sensor 135*a*. When the air-fuel ratio AF is not out of the normal range but is in the normal range (step S160: no), the air-fuel ratio sensor 135*a* is identified as normal (step S170). The CPU 24*a* then resets the failure detection flag F to 0 (step S195) and exits from the air-fuel ratio sensor failure detection routine. When the air-fuel ratio AF is out of the normal range (step S160: yes), on the other hand, it is determined whether the state of the air-fuel ratio AF out of the normal range has continued for a preset time period T2 (step S180). The preset time period T2 represents a required time period for confirmation of failure of the air-fuel ratio sensor 135*a* and is, for example, 3 seconds. When the air-fuel ratio AF is out of the normal range (step S160: yes) but the state of the air-fuel ratio AF out of the normal range has not continued for the preset time period T2 (step S180: no), the current timing is not suitable for the failure detection. The air-fuel ratio sensor failure detection routine is thus terminated at this moment. When the state of the air-fuel ratio AF out of the normal range has continued for the preset time period T2 (step S180: yes), on the other hand, the air-fuel ratio sensor 135*a* is identified as abnormal (step S190). The CPU 24*a* then resets the failure detection flag F to 0 (step S195) and exits from the air-fuel ratio sensor failure detection routine. A certain time period (preset time period T1+preset time period T2) is required for identification of the normal or abnormal state of the air-fuel ratio sensor 135*a*.

Figure 5:
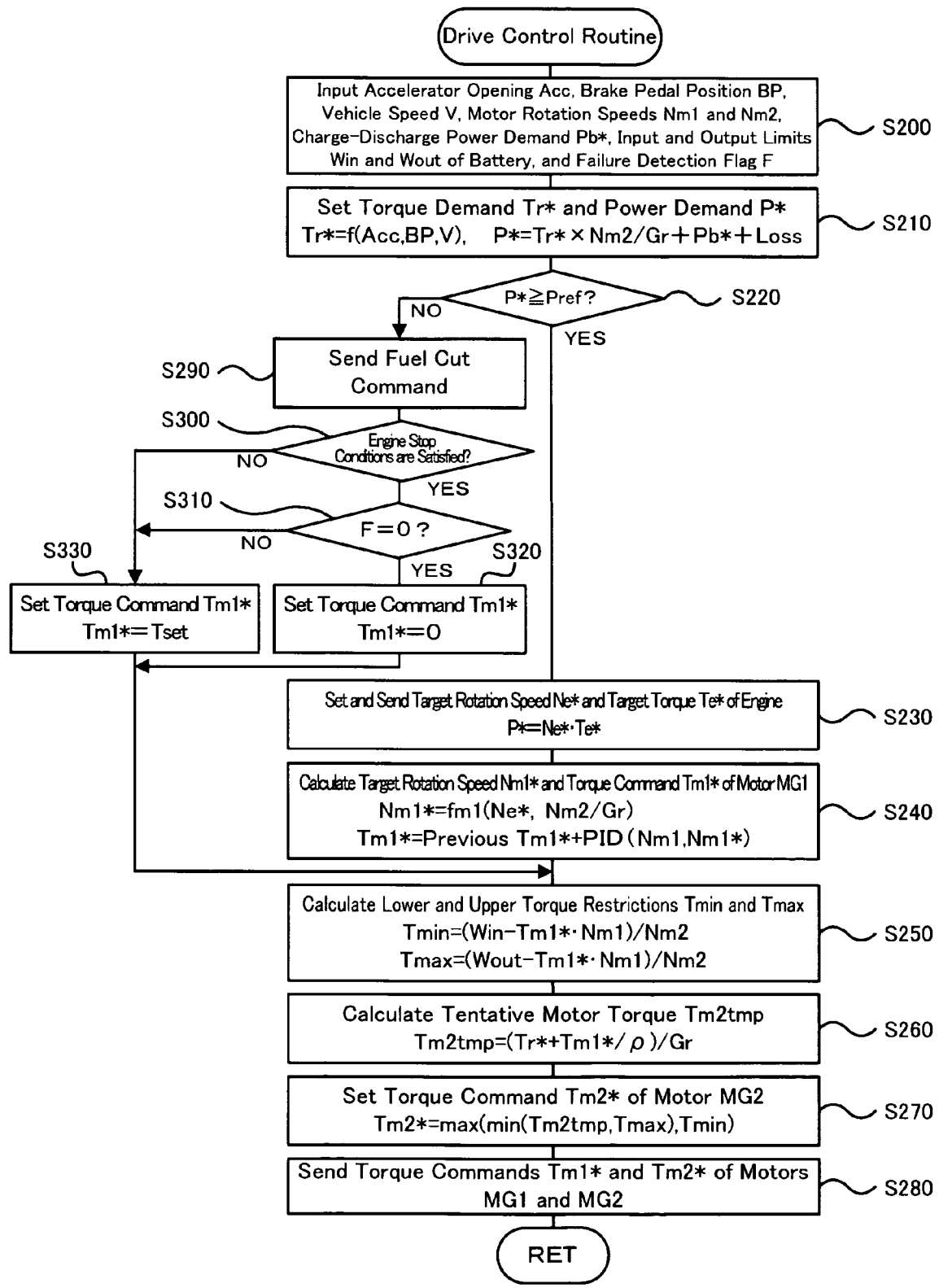
FIG. 5 is a drive control routine executed by a hybrid electronic control unit mounted on the hybrid vehicle of the embodiment.

The drive control relevant to the failure detection is described below. FIG. 5 is a flowchart showing a drive control routine executed by the hybrid electronic control unit 70. The drive control routine is repeatedly performed at preset time intervals, for example, at every several msec.

In the drive control routine of FIG. 5, the CPU 72 of the hybrid electronic control unit 70 first inputs various data required for control, that is, the accelerator opening Acc from the accelerator pedal position sensor 84, the brake pedal position BP from the brake pedal position sensor 86, the vehicle speed V from the vehicle speed sensor 88, rotation speeds Nm1 and Nm2 of the motors MG1 and MG2, a charge-discharge power demand Pb* of the battery 50, an input limit Win and an output limit Wout of the battery 50, and the failure detection flag F (step S200). The rotation speeds Nm1 and Nm2 of the motors MG1 and MG2 are computed from the rotational positions of the respective rotors in the motors MG1 and MG2 detected by the rotational position detection sensors 43 and 44 and are received from the motor ECU 40 by communication. The charge-discharge power demand Pb* of the battery 50 is set based on the state of charge SOC of the battery 50 and is received from the battery ECU 52 by communication. The input limit Win and the output limit Wout of the battery 50 are set based on the battery temperature Tb measured by the temperature sensor 51 and the state of charge SOC of the battery 50 and are received from the battery ECU 52 by communication. The failure detection flag F is set to 1 at a start of failure detection of the air-fuel ratio sensor 135a and is reset to 0 on completion of the failure detection. The failure detection flag F is received from the engine ECU 24 by communication.

Figure 6:
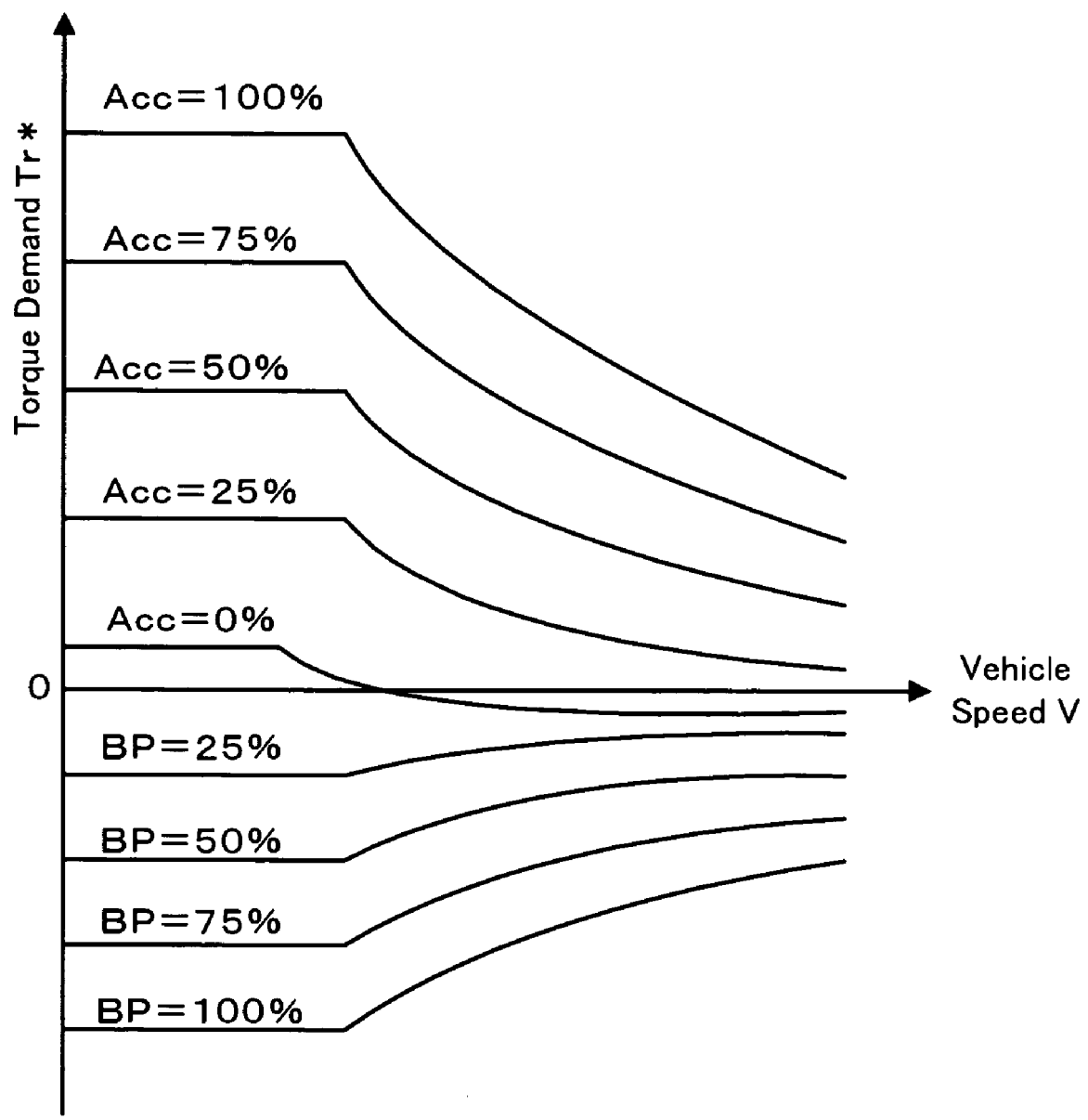
FIG. 6 shows one example of a torque demand setting map.

After the data input, the CPU 72 sets a torque demand Tr* to be output to the ring gear shaft 32a or a driveshaft linked with the drive wheels 63a and 63b as a torque required for the hybrid vehicle 20 and a power demand P* required for the hybrid vehicle 20, based on the input accelerator opening Acc, the input brake pedal position BP, and the input vehicle speed V (step S210). A concrete procedure of setting the torque demand Tr* in this embodiment stores in advance variations in torque demand Tr* against the accelerator opening Acc, the brake pedal position BP, and the vehicle speed V as a torque demand setting map in the ROM 74 and reads the torque demand Tr* corresponding to the given accelerator opening Acc, the given brake pedal position BP, and the given vehicle speed V from this torque demand setting map. One example of the torque demand setting map is shown in FIG. 6. The power demand P* is calculated as the sum of the product of the torque demand Tr* and a rotation speed Nr of the ring gear shaft 32a, the charge-discharge power demand Pb* to be charged into or discharged from the battery 50, and a potential loss. The rotation speed Nr of the ring gear shaft 32a is obtained by multiplying the vehicle speed V by a preset conversion factor k or by dividing the rotation speed Nm2 of the motor MG2 by a gear ratio Gr of the reduction gear 35.

The power demand P* is compared with a predetermined reference power Pref (step S220). The reference power Pref is used as the criterion for stopping the operation of the engine 22 and is set to a minimum power level that ensures efficient operation of the engine 22 or a similar value.

Figure 7:
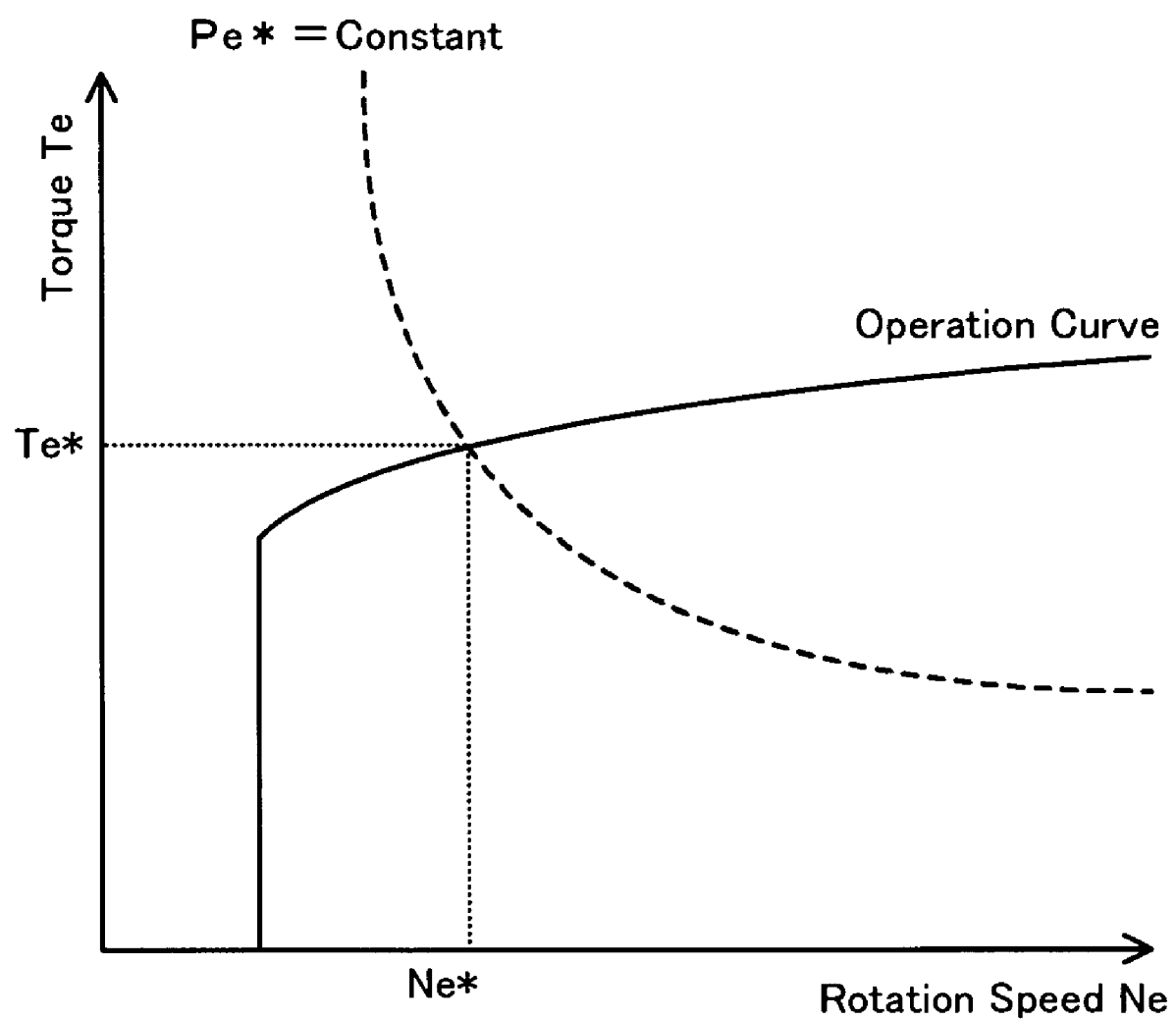
FIG. 7 shows an efficient operation line of an engine to set a target rotation speed Ne* and a target torque Te*.

When the power demand P* is not less than the predetermined reference power Pref at step S220, the CPU 72 sets a target rotation speed Ne* and a target torque Te* of the engine 22 corresponding to the power demand P* and sends a control signal to the engine ECU 24 to operate the engine 22 with the set target rotation speed Ne* and target torque Te* (step S230). The target rotation speed Ne* and the target torque Te* of the engine 22 are determined according to an efficient operation line of ensuring efficient operations of the engine 22 and a curve of the power demand P*. FIG. 7 shows an efficient operation line of the engine 22 to set the target rotation speed Ne* and the target torque Te*. As clearly shown in FIG. 7, the target rotation speed Ne* and the target torque Te* are given as an intersection of the efficient operation line and a curve of constant power demand P* (=Ne*× Te*).

The CPU 72 calculates a target rotation speed Nm1* of the motor MG1 from the target rotation speed Ne* of the engine 22, the rotation speed Nr (=Nm2/Gr) of the ring gear shaft 32a, and a gear ratio $\rho$ of the power distribution integration mechanism 30 according to Equation (1) given below, while calculating a torque command Tm1* of the motor MG1 from the calculated target rotation speed Nm1* and the current rotation speed Nm1 of the motor MG1 according to Equation (2) given below (step S240):

$$Nm1^* = Ne^* \cdot (1+\rho)/\rho - Nm2/(Gr \cdot \rho) \quad (1)$$

$$Tm1^* = \text{Previous}Tm1^* + k1(Nm1^* - Nm1) + k2\int(Nm1^* - Nm1)dt \quad (2)$$

Figure 8:
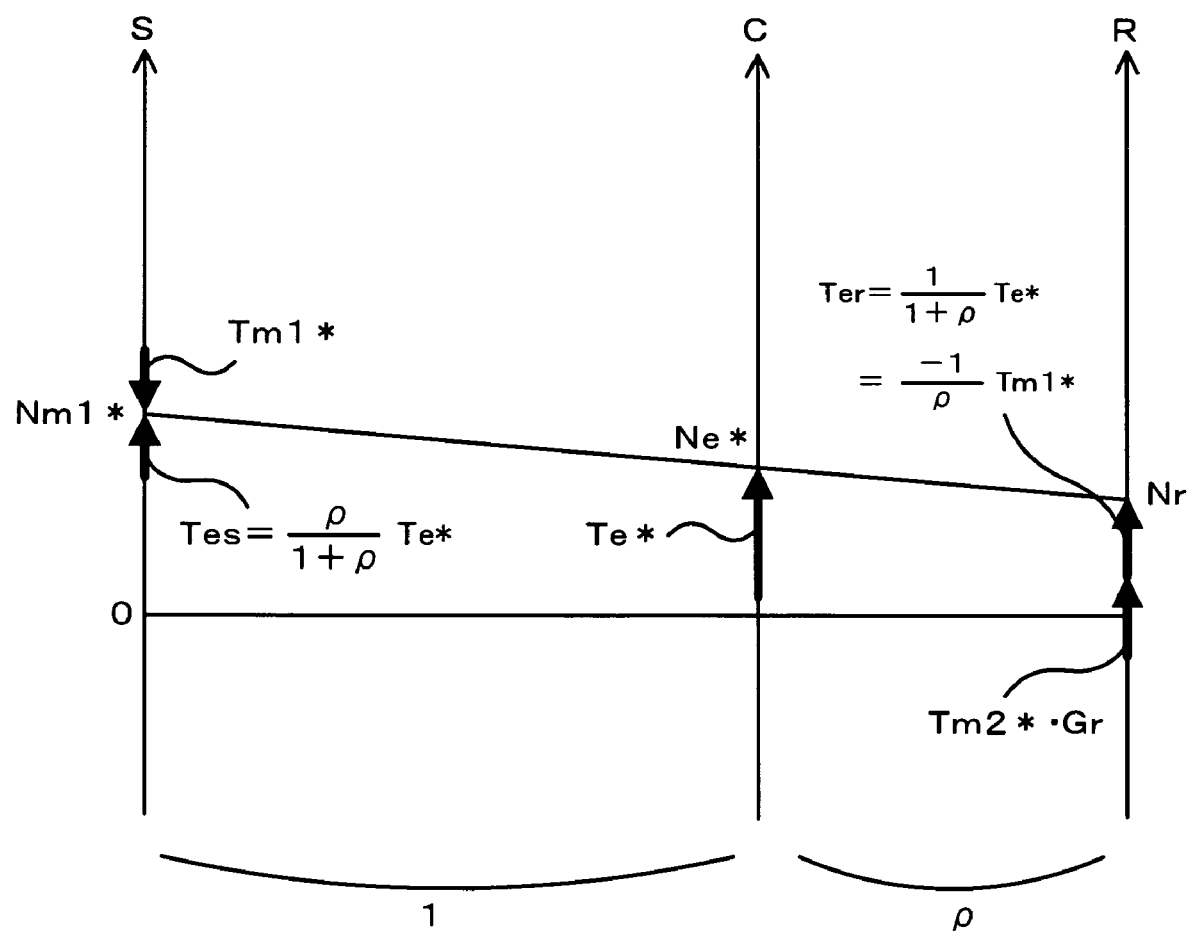
FIG. 8 is an alignment chart showing torque-rotation speed dynamics of respective rotation elements included in a power distribution integration mechanism mounted on the hybrid vehicle of the embodiment.

Equation (1) is a dynamic relational expression of the rotation elements included in the power distribution integration mechanism 30. FIG. 8 is an alignment chart showing torque-rotation speed dynamics of the respective rotation elements included in the power distribution integration mechanism 30. The left axis 'S' represents the rotation speed of the sun gear 31 that is equivalent to the rotation speed Nm1 of the motor MG1. The middle axis 'C' represents the rotation speed of the carrier 34 that is equivalent to the rotation speed Ne of the engine 22. The right axis 'R' represents the rotation speed Nr of the ring gear 32 obtained by dividing the rotation speed Nm2 of the motor MG2 by the gear ratio Gr of the reduction gear 35. Equation (1) is readily introduced from the alignment chart of FIG. 8. Two upward thick arrows on the axis 'R' in FIG. 8 respectively show a torque transmitted to the ring gear shaft 32a when the torque Te* is output from the engine 22 in steady operation at a specific drive point of the target rotation speed Ne* and the target torque Te*, and a torque applied to the ring gear shaft 32a via the reduction gear 35 when a torque Tm2* is output from the motor MG2. Equation (2) is a relational expression of feedback control to drive and rotate the motor MG1 at the target rotation speed Nm1*. In Equation (2) given above, 'k1' in the second term and 'k2' in the third term on the right side respectively denote a gain of the proportional and a gain of the integral term.

After calculation of the target rotation speed Nm1* and the torque command Tm1* of the motor MG1, the CPU 72 calculates a lower torque restriction Tmin and an upper torque restriction Tmax as minimum and maximum torques output from the motor MG2 according to Equations (3) and (4) given below (step S250):

$$T\min = (Win - Tm1^* \cdot Nm1)/Nm2 \quad (3)$$

$$T\max = (Wout - Tm1^* \cdot Nm1)/Nm2 \quad (4)$$

The lower torque restriction Tmin and the upper torque restriction Tmax are respectively given by dividing a difference between the input limit Win of the battery 50 and power consumption (power generation) of the motor MG1, which is the product of the torque command Tm1* and the current rotation speed Nm1 of the motor MG1, and a difference between the output limit Wout of the battery 50 and the power consumption (power generation) of the motor MG1 by the current rotation speed Nm2 of the motor MG2. The CPU 72 then calculates a tentative motor torque Tm2tmp to be output from the motor MG2 from the torque demand Tr*, the torque command Tm1* of the motor MG1, the gear ratio $\rho$ of the power distribution integration mechanism 30, and the gear ratio Gr of the transmission 60 according to Equation (5) given below (step S260):

$$Tm2tmp = (Tr^* + Tm1^*/\rho)/Gr \quad (5)$$

The CPU 72 limits the tentative motor torque Tm2tmp to the range between the calculated lower torque restriction Tmin and upper torque restriction Tmax to set a torque command Tm2* of the motor MG2 (step S270). Setting the torque command Tm2* of the motor MG2 in this manner restricts the torque demand Tr* to be output to the ring gear shaft 32a or the driveshaft in the range of the input limit Win and the output limit Wout of the battery 50. Equation (5) is readily introduced from the alignment chart of FIG. 8.

After setting the torque commands Tm1* and Tm2* of the motors MG1 and MG2, the CPU 72 sends the torque commands Tm1* and Tm2* of the motors MG1 and MG2 to the motor ECU 40 (step S280), and exits from the drive control routine of FIG. 5. The motor ECU 40 receives the torque commands Tm1* and Tm2* and performs switching control of the switching elements included in the respective inverters 41 and 42 to drive the motor MG1 with the torque command Tm1* and the motor MG2 with the torque command Tm2*.

Figure 9:
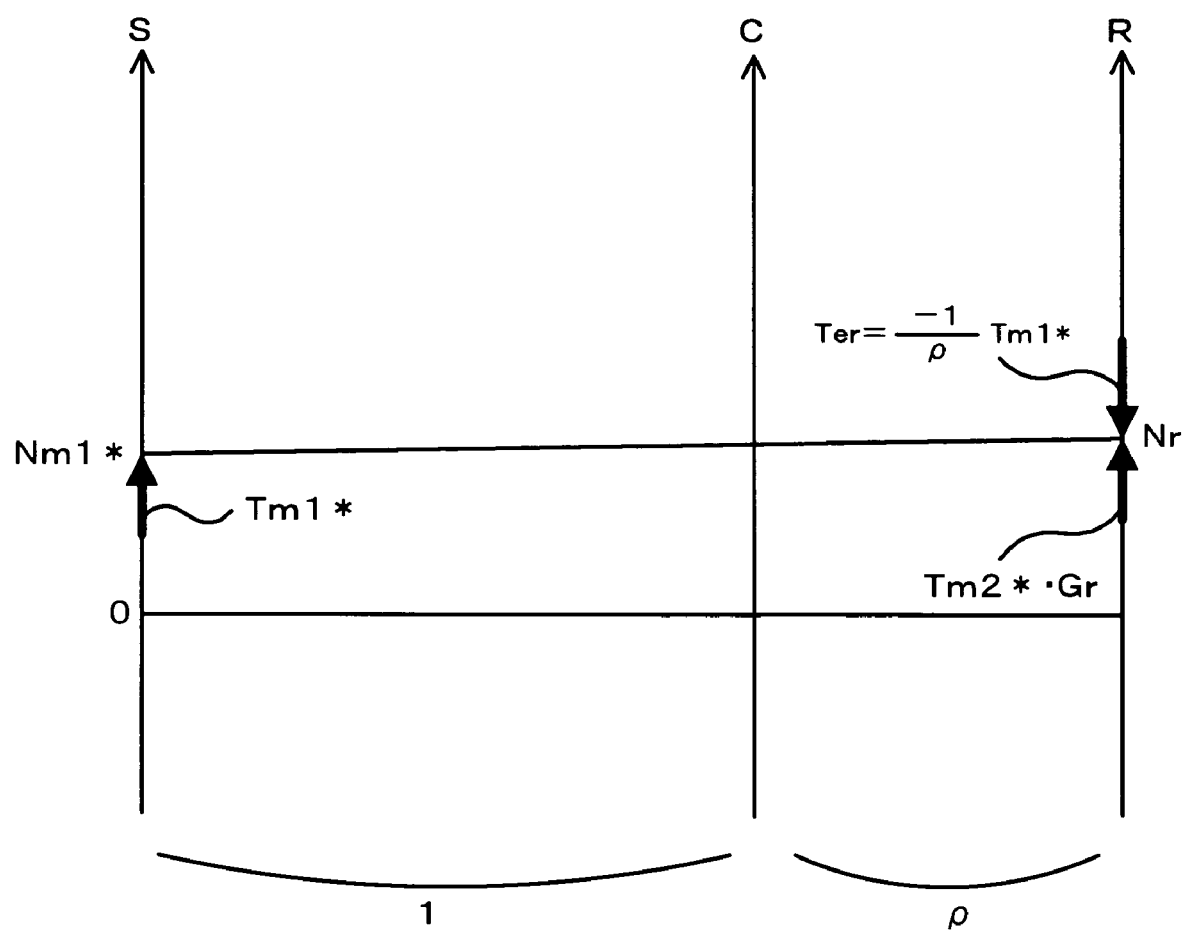
FIG. 9 is an alignment chart showing torque-rotation speed dynamics of the respective rotation elements included in the power distribution integration mechanism in the process of motoring the engine by means of a motor MG1.

When the power demand P* is less than the predetermined reference power Pref at step S220, the CPU 72 sends a fuel cut command to the engine ECU 24 to cut the fuel supply to the engine 22 (step S290) and identifies satisfaction or dissatisfaction of engine stop conditions for stopping the operation (rotation) of the engine 22 (step S300). Upon dissatisfaction of the engine stop conditions, a torque Tset required for motoring the engine 22 by means of the motor MG1 is set to the torque command Tm1* of the motor MG1 (step S330). The CPU 72 subsequently calculates the lower torque restriction Tmin and the upper torque restriction Tmax of the motor MG2 according to Equations (3) and (4) given above (step S250), calculates the tentative motor torque Tm2tmp of the motor MG2 according to Equation (5) (step S260), sets the torque command Tm2* of the motor MG2 by limiting the tentative motor torque Tm2tmp to the range between the calculated lower torque restriction Tmin and upper torque restriction Tmax (step S270), and sends the torque commands Tm1* and Tm2* of the motors MG1 and MG2 to the motor ECU 40 (step S280). In this state, the air-fuel ratio sensor failure detection routine is performed. One example of the engine stop conditions may be the power demand P* of less than the predetermined reference power Pref and the vehicle speed V of lower than a preset reference speed Vref (for example, 60 km/hour). Another example of the engine stop conditions may be no output request of a braking force to the ring gear shaft 32a, where the braking force is based on the friction resistance occurring when the engine 22 is motored in the fuel cut state. The rotation of the engine 22 is not stopped when the vehicle speed V is not lower than the preset reference speed Vref. This is because the stop of rotation of the engine 22 at the high vehicle speed V (high rotation speed Nr of the ring gear shaft 32a) may cause overspeed rotation of the motor MG1 as clearly understood from the alignment chart of FIG. 8. FIG. 9 is an alignment chart showing torque-rotation speed dynamics of the respective rotation elements included in the power distribution integration mechanism 30 in the process of motoring the engine 22 by means of the motor MG1. Two thick arrows on the axis 'R' in FIG. 9 respectively show a braking torque transmitted to the ring gear shaft 32a in the process of motoring the engine 22 by means of the motor MG1 and a torque applied to the ring gear shaft 32a via the reduction gear 35 in the case of outputting the torque Tm2* from the motor MG2. As illustrated, the motor MG2 receives the reactive force of the ring gear shaft 32a in the process of motoring the engine 22 by means of the motor MG1. The torque demand Tr* can thus be output to the ring gear shaft 32a.

Upon satisfaction of the engine stop conditions at step S300, the CPU 72 identifies whether the failure detection flag F is equal to 0 (step S310). When the failure detection flag F is equal to 0, the torque command Tm1* as the torque to be output from the motor MG1 is set equal to '0' to stop the rotation of the engine 22 (step S320). The CPU 72 sequentially performs the processing of steps S250 to S280 and exits from the drive control routine of FIG. 5. In this state, the hybrid vehicle 20 is driven in the motor drive mode with stopping the operation (rotation) of the engine 22.

When the failure detection flag F is equal to 1 at step S310, on the other hand, the torque Tset required for motoring is set to the torque command Tm1* of the motor MG1 to enable motoring of the engine 22 by means of the motor MG1, irrespective of satisfaction or dissatisfaction of the engine stop conditions (step S330). The CPU 72 sequentially performs the processing of steps S250 to S280 and exits from the drive control routine of FIG. 5. Even when the engine stop conditions are satisfied during execution of the failure detection of the air-fuel ratio sensor 135a, which is expressed by the failure detection flag F set equal to 1, the rotation of the engine 22 in the fuel cut condition is kept until completion of the failure detection. Such control effectively prevents interruption of the failure detection of the air-fuel ratio sensor 135a and thus ensures the adequate frequency of the failure detection of the air-fuel ratio sensor 135a.

The driver's significant depression of the accelerator pedal 83 during execution of the failure detection of the air-fuel ratio sensor 135a may lead to the determination result of step S220 that the power demand P* is not less than the predetermined reference power Pref. In this state, the power output to the ring gear shaft 32a has priority over the failure detection of the air-fuel ratio sensor 135a. The engine 22 is accordingly driven with the target rotation speed Ne* and the target torque Te* corresponding to the power demand P* (steps S230 to S280). In this case, the air-fuel ratio sensor failure detection routine identifies that the engine 22 is not rotated in the fuel cut condition at step S100. The failure detection of the air-fuel ratio sensor 135a is thus interrupted.

As described above, when the engine stop conditions for stopping the operation (rotation) of the engine 22 are satisfied during execution of the failure detection of the air-fuel ratio sensor 135a with the engine 22 rotated in the fuel cut state, the hybrid vehicle 20 of the embodiment keeps the fuel cut state of the engine 22 until completion of the failure detection and controls the motor MG1 to motor the engine 22. Such control continues the failure detection of the air-fuel ratio sensor 135a and accordingly assures the sufficient chance of failure detection of the air-fuel ratio sensor 135a. When the driver steps on the accelerator pedal 83 during execution of the failure detection of the air-fuel ratio sensor 135a to increase the power demand P* to or over the predetermined reference power Pref, the power output to the ring gear shaft 32a has priority over the failure detection of the air-fuel ratio sensor 135a. This ensures a quick response to the driver's operation of the accelerator pedal 83.

In the hybrid vehicle 20 of the embodiment, the drive control routine is applied to the failure detection of the air-fuel ratio sensor 135a. The drive control routine may be applied to detect any other suitable state of the air-fuel ratio sensor 135a, for example, to learn the air-fuel ratio AF (reference value) of the air-fuel ratio sensor 135a in the atmospheric state.

In response to satisfaction of the engine stop conditions for stopping the operation (rotation) of the engine 22 during execution of the failure detection of the air-fuel ratio sensor 135a, the hybrid vehicle 20 of the embodiment keeps the fuel cut condition of the engine 22 and controls the motor MG1 to motor the engine 22, so as to continue the failure detection of the air-fuel ratio sensor 135a. The trigger for continuation of the failure detection is, however, not restricted to satisfaction of the engine stop conditions but may be engine idling conditions. In response to satisfaction of the engine idling conditions for idling the engine 22, the modified drive control may keep the fuel cut state of the engine 22 and control the motor MG1 to motor the engine 22, in order to continue the failure detection of the air-fuel ratio sensor 135a. On completion of the failure detection, the engine 22 runs idle.

Figure 10:
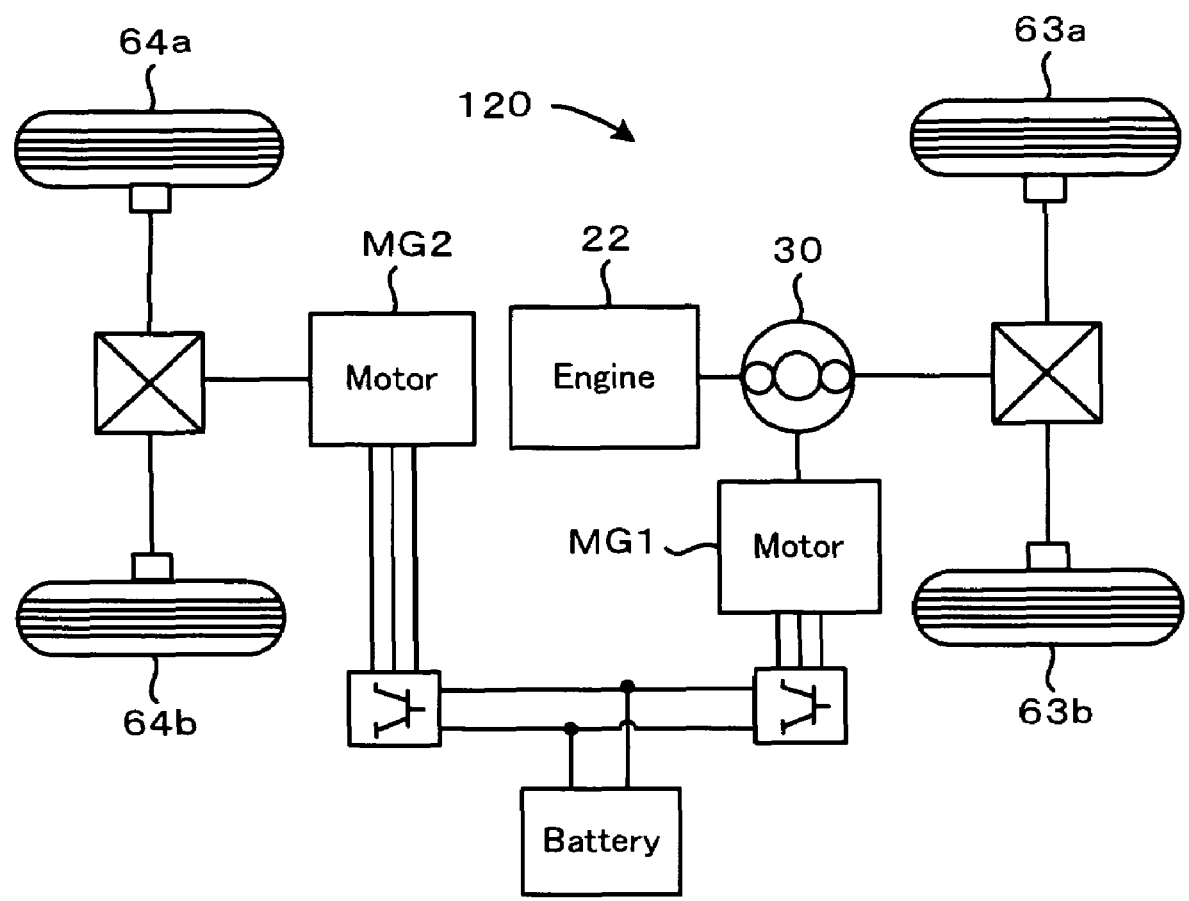
FIG. 10 schematically illustrates the configuration of another hybrid vehicle in one modified example.

In the hybrid vehicle 20 of the embodiment, the power of the motor MG2 is subjected to gear change by the reduction gear 35 and is out put to the ring gear shaft 32a. In one possible modification shown as a hybrid vehicle 120 of FIG. 10, the power of the motor MG2 may be output to another axle (that is, an axle linked with wheels 64a and 64b), which is different from an axle connected with the ring gear shaft 32a (that is, an axle linked with the wheels 63a and 63b).

Figure 11:
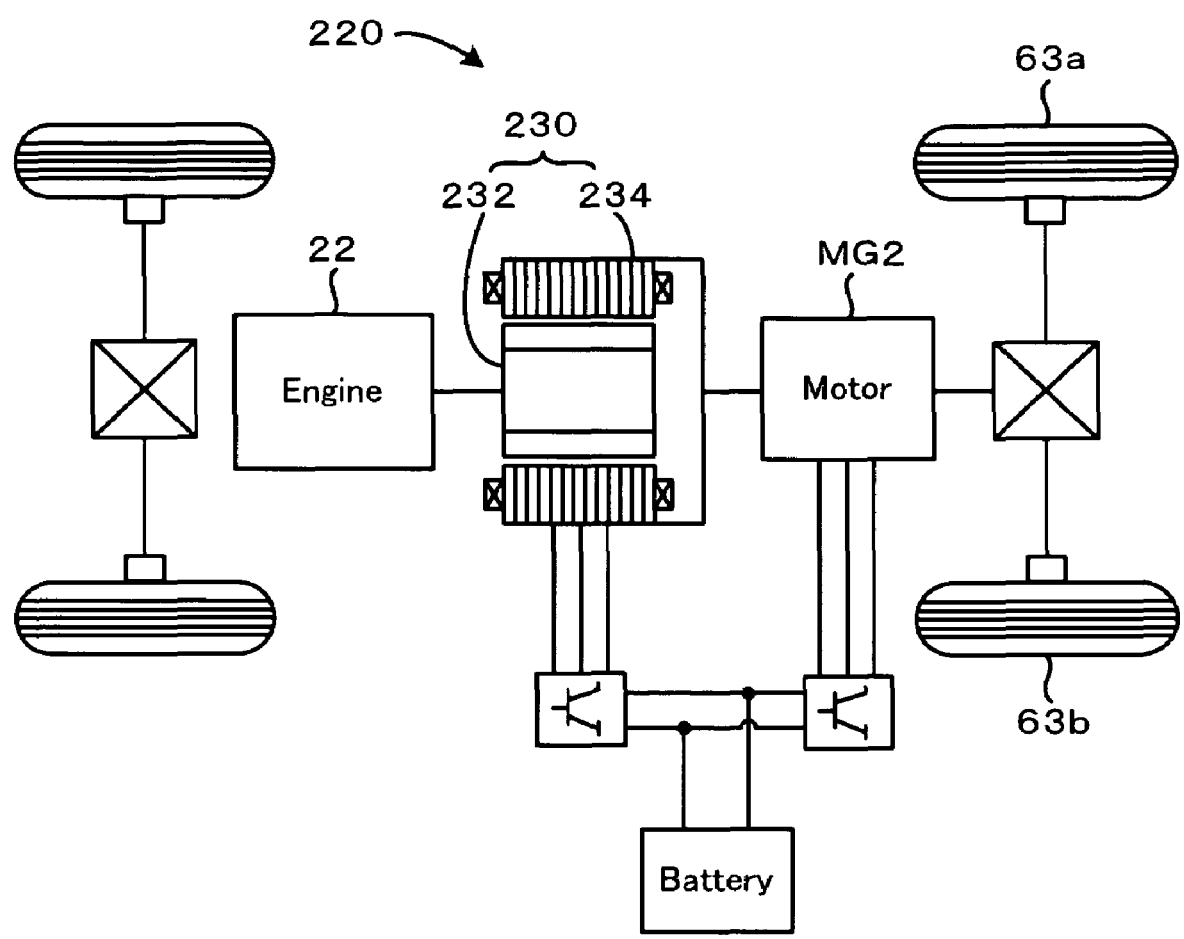
FIG. 11 schematically illustrates the configuration of still another hybrid vehicle in another modified example.

In the hybrid vehicle 20 of the embodiment, the power of the engine 22 is output via the power distribution integration mechanism 30 to the ring gear shaft 32a functioning as the drive shaft linked with the drive wheels 63a and 63b. In another possible modification of FIG. 11, a hybrid vehicle 220 may have a pair-rotor motor 230, which has an inner rotor 232 connected with the crankshaft 26 of the engine 22 and an outer rotor 234 connected with the drive shaft for outputting the power to the drive wheels 63a, 63b and transmits part of the power output from the engine 22 to the drive shaft while converting the residual part of the power into electric power.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

The disclosure of Japanese Patent Application No. 2005-379232 filed Dec. 28, 2005 including specification, drawings and claims is incorporated herein by reference in its entirety.

What is claimed is:

1. A control method of a power output apparatus, said power output apparatus comprising: an internal combustion engine that is operable independently of a rotating state of a driveshaft; a motoring structure that is capable of motoring the internal combustion engine; and an oxygen concentration measurement unit that is located in an exhaust system of the internal combustion engine to measure an oxygen concentration in exhaust emission from the internal combustion engine,
said control method comprising the steps of:
(a) detecting a current status of the oxygen concentration measurement unit based on a measurement result of the oxygen concentration measurement unit, when a predetermined execution condition is satisfied in a fuel injection-stop engine rotation state where the internal combustion engine is rotated with stop of fuel injection; and
(b) controlling the internal combustion engine and the motoring structure to maintain the fuel injection-stop engine rotation state upon satisfaction of a predetermined cancellation condition for canceling the fuel injection-stop engine rotation state during detection of the current status of the oxygen concentration measurement unit in said step (a), and
controlling the internal combustion engine and the motoring structure to cancel the fuel injection-stop engine rotation state on completion of the detection of the current status.

2. A control method of a power output apparatus in accordance with claim 1, wherein said step (a) detects a failure of the oxygen concentration measurement unit as the current status, based on a result of determination whether the oxygen concentration measured by the oxygen concentration measurement unit has continuously been out of a specified normal range for a preset time period.

3. A control method of a power output apparatus in accordance with claim 1, wherein when an operation stop request of the internal combustion engine is given as the predetermined cancellation condition for canceling the fuel injection-stop engine rotation state during detection of the current status of the oxygen concentration measurement unit by said step (a), said step (b) controls the internal combustion engine and the motoring structure to maintain the fuel injection-stop engine rotation state until completion of the detection by said step (a),
said step (b) controlling the internal combustion engine and the motoring structure to stop operation of the internal combustion engine on completion of the detection by said step (a).

4. A vehicle; said vehicle comprising:
an internal combustion engine that is operable independently of a rotating state of a driveshaft linked with an axle;
a motoring structure that is capable of motoring the internal combustion engine;
an oxygen concentration measurement unit that is located in an exhaust system of the internal combustion engine to measure an oxygen concentration in exhaust emission from the internal combustion engine;
a status detection module that detects a current status of the oxygen concentration measurement unit based on a measurement result of the oxygen concentration measurement unit, when a predetermined execution condition is satisfied in a fuel injection-stop engine rotation state where the internal combustion engine is rotated with stop of fuel injection; and
a status detection-time control module that controls the internal combustion engine and the motoring structure to maintain the fuel injection-stop engine rotation state upon satisfaction of a predetermined cancellation condition for canceling the fuel injection-stop engine rotation state during detection of the current status of the oxygen concentration measurement unit by said status detection module,
said status detection-time control module controlling the internal combustion engine and the motoring structure to cancel the fuel injection-stop engine rotation state on completion of the detection of the current status.

5. A vehicle in accordance with claim 4, wherein said status detection module detects a failure of the oxygen concentration measurement unit as the current status, based on a result of determination whether the oxygen concentration measured by the oxygen concentration measurement unit has continuously been out of a specified normal range for a preset time period.

6. A vehicle in accordance with claim 4, wherein when an operation stop request of the internal combustion engine is given as the predetermined cancellation condition for canceling the fuel injection-stop engine rotation state during detection of the current status of the oxygen concentration measurement unit by said status detection module, said status detection-time control module controls the internal combustion engine and the motoring structure to maintain the fuel injection-stop engine rotation state until completion of the detection by said status detection module, said status detection-time control module controlling the internal combustion engine and the motoring structure to stop operation of the internal combustion engine on completion of the detection by said status detection module.

7. A vehicle in accordance with claim 4, said vehicle further comprising:
a motor that is capable of inputting and outputting power from and to the driveshaft,
wherein the motoring structure utilizes a reactive force of the driveshaft to motor the internal combustion engine, and
said status detection-time control module drives and controls the motor to receive the reactive force and to ensure output of a power, which is equivalent to a power demand required for the driveshaft, to the driveshaft.

8. A power output apparatus that outputs power to a driveshaft, said power output apparatus comprising:
an internal combustion engine that is operable independently of a rotating state of the driveshaft;
a motoring structure that is capable of motoring the internal combustion engine;
an oxygen concentration measurement unit that is located in an exhaust system of the internal combustion engine to measure an oxygen concentration in exhaust emission from the internal combustion engine;
a status detection module that detects a current status of the oxygen concentration measurement unit based on a measurement result of the oxygen concentration measurement unit, when a predetermined execution condition is satisfied in a fuel injection-stop engine rotation state where the internal combustion engine is rotated with stop of fuel injection; and
a status detection-time control module that controls the internal combustion engine and the motoring structure to maintain the fuel injection-stop engine rotation state upon satisfaction of a predetermined cancellation condition for canceling the fuel injection-stop engine rotation state during detection of the current status of the oxygen concentration measurement unit by said status detection module,
said status detection-time control module controlling the internal combustion engine and the motoring structure to cancel the fuel injection-stop engine rotation state on completion of the detection of the current status.

9. A power output apparatus in accordance with claim 8, wherein when an operation stop request of the internal combustion engine is given as the predetermined cancellation condition for canceling the fuel injection-stop engine rotation state during detection of the current status of the oxygen concentration measurement unit by said status detection module, said status detection-time control module controls the internal combustion engine and the motoring structure to maintain the fuel injection-stop engine rotation state until completion of the detection by said status detection module,
said status detection-time control module controlling the internal combustion engine and the motoring structure to stop operation of the internal combustion engine on completion of the detection by said status detection module.

10. A power output apparatus in accordance with claim 8, wherein said status detection module requires a certain time period for detection of the current status of the oxygen concentration measurement unit.

11. A power output apparatus in accordance with claim 10, wherein said status detection module detects a failure of the oxygen concentration measurement unit as the current status, based on a result of determination whether the oxygen concentration measured by the oxygen concentration measurement unit has continuously been out of a specified normal range for a preset time period.

12. A power output apparatus in accordance with claim 8, said power output apparatus further comprising:
a motor that is capable of inputting and outputting power from and to the driveshaft,
wherein the motoring structure utilizes a reactive force of the driveshaft to motor the internal combustion engine, and
said status detection-time control module drives and controls the motor to receive the reactive force and to ensure output of a power, which is equivalent to a power demand required for the driveshaft, to the driveshaft.

13. A power output apparatus in accordance with claim 12, wherein the motoring structure comprises an electric power-mechanical power input output mechanism that is connected with an output shaft of the internal combustion engine and with the driveshaft and outputs at least part of output power of the internal combustion engine to the driveshaft through input and output of electric power and mechanical power.

14. A power output apparatus in accordance with claim 13, wherein the fuel injection-stop engine rotation state is activated upon satisfaction of a preset fuel injection stop condition when the power demand required for the driveshaft is less than a preset reference power, and
when the power demand increases to or over the preset reference power during detection of the current status of the oxygen concentration measurement unit by said status detection module, said status detection-time control module controls the internal combustion engine, the electric power-mechanical power input output mechanism, and the motor to cancel the fuel injection-stop engine rotation state even during the detection of the current status and to ensure output of the power equivalent to the power demand to the driveshaft.

15. A power output apparatus in accordance with claim 13, wherein said electric power-mechanical power input output mechanism comprises:
a three shaft-type power input output module that is linked to three shafts, the output shaft of the internal combustion engine, the driveshaft, and a third shaft, and inputs and outputs power from and to a residual one shaft based on powers input from and output to any two shafts among the three shafts; and
a generator that inputs and outputs power from and to the third shaft.

16. A power output apparatus in accordance with claim 13, wherein said electric power-mechanical power input output mechanism comprises:
a pair-rotor motor that has a first rotor connected to the output shaft of the internal combustion engine and a second rotor connected to the driveshaft and is driven to rotate through relative rotation of the first rotor to the second rotor.

\* \* \* \* \*